> United States Patent Office 3,804,917
Patented Apr. 16, 1974

3,804,917
POLYMERIZATION PROCESS
John W. Shepard, Munster, Ind., and Omar O. Juveland, South Holland, Ill., assignors to Standard Oil Company, Chicago, Ill.
No Drawing. Continuation-in-part of abandoned application Ser. No. 434,393, Feb. 23, 1965. This application Oct. 15, 1968, Ser. No. 767,804
Int. Cl. C08f 1/66
U.S. Cl. 260—683.15 R    2 Claims

ABSTRACT OF THE DISCLOSURE

Ethylene, propylene and mixtures thereof are polymerized with a catalyst prepared by distributing a minor amount of a transition metal oxide of Groups Va and VIa of the Periodic Table upon a major amount of alumina having a surface area within the range of 150 to 500 m.$^2$/gm. and a pore diameter within the range of 100 to 200 A., then reducing the transition metal to an average valence about 1 less than maximum and chloriding the resulting combination with anhydrous hydrogen chloride to a chorine content of about 2 to 5 percent by weight.

BACKGROUND OF THE INVENTION

This application is a continuation-in-part of copending application Ser. No. 434,393, filed Feb. 23, 1965, now abandoned.

This invention relates to improved catalysts for the polymerization of organic compounds containing a carbon-carbon double bond, to the method of manufacture of such catalysts and to their use in polymerization processes. More specifically, the improved catalysts of our invention are Group V or VI transition metal oxides distributed upon an inert support material having pores with a diameter within a narrow and critical range.

Catalysts for polymerization which contain Group Va and VIa transition metal oxides (according to the designation presented in Moeller, Inorganic Chemistry, J. Wiley and Sons, Inc. (1952) distributed upon an inert support are known to the polymerization art. Such catalysts are disclosed and/or claimed in U.S. Pats. 2,691,647; 2,692,-257; 2,710,854; 2,725,374; 2,726,231; 2,728,757 and 2,773,053, among others. The catalysts of our invention represent a considerable improvement over the prior art catalysts in that much increased yields of polymer product are possible when polymerization processes are carried out with our catalysts as compared to those of the prior art. These increased yields of polymer product are achieved by reason of the particular support or base material used in our novel catalysts, and by the particular treatment of the catalyst prior to use in polymerization. The specific aspects of our base material and catalyst treatment are set forth hereinbelow, but broadly, our novel catalysts result from use of a catalyst base having a pore diameter of from about 100 to about 200 A. and a chloride treatment of the catalyst following deposition of a transition metal oxide upon the base or support.

The support material having a pore diameter of from 100 to 200 A. is desirably an alumina in one of the well-known catalytically active forms, such as gamma. The support may be an alumina alone, or it may contain minor amounts of other oxides inert under the conditions of subsequent use. For example, a predominantly alumina support can be used which contains 1–2% of silica for the purpose of physically strengththening the support. We prefer that the support contain no more than about 10% silica, for larger amounts apparently cause some reduction in catalyst activity when certain transition metal oxides, particularly molybdena, are used on the support. We have found that the support material should desirably be free of basic impurities, such as sodium oxide, calcium oxide, nitrogen compound, of which ammonia is exemplary, etc. Acidic contaminants, such as sulfates, should also be absent, or if present, should be present in only very small amounts. Iron compounds are also desirably absent from the supports. The preparation of suitable support materials may be according to any of the techniques known to the catalyst art, such as the preparation of catalysts of the type employed in hydroforming, that is, catalysts of the type described in U.S. Pats. 2,320,147; 2,388,536; 2,357,-332, etc. For the practice of our invention, it is necessary that the alumina supports should be prepared with particular pore diameters. Techniques for obtaining desired pore diameters are known to the art and used in the preparation of the materials known as molecular sieves. Suitable supports can also be purchased from suppliers of hydroforming catalysts, and exemplary of such supports are the HF-type aluminas having a surface area of about 350 m.$^2$/gm. available from the Nalco Chemical Company with various pore diameters. The surface area of the support should be in the range of 1 to 1500 m.$^2$/gm., with surface areas of 150 to 500 m.$^2$/gm. being preferred.

The transition metal oxide used on the described supports in making our novel catalysts are the oxides of Group Va and VIa of the Periodic Table, particularly the oxides of molybdenum, chromium, tungsten, vanadium, niobium and tantalum. The oxides can be produced on the support by impregnating the support with a solution of an inorganic or organic salt of the chosen transition metal compound followed by calcination in the presence of oxygen. Exemplary of suitable salts are the ammonium salts, oxalate complexes, and acetyl-acetonates. Other useful compounds will be obvious to those of skill in the art. The transition metal should be reduced below its maximum valence state prior to use for polymerization, according to procedures described hereinbelow.

The chloride treatment of a supported transition metal oxide catalyst produces a catalyst having surprisingly improved polymerizing ability. The catalysts of our invention which are transition metal oxides supported on bases of particular pore diameters have an improved polymerizing activity as compared to those heretofore known to the art. This improvement, however, is relatively modest as compared to that obtained with the chlorided catalyst, as is evident in the examples presented hereinbelow, and as can be seen in the attached figure. Chloriding of the catalyst is conveniently performed by exposing the catalyst to a hydrogen chloride at elevated temperature, for example, from 250–500° C. The mechanism by which the chloriding treatment brings about an improved activity of the catalyst is not known with certitude.

The improved catalysts of our invention may be promoted with various promoters known to this art as useful in conjunction with supported transition metal oxide catalysts. These are such materials as the alkali metals, alkali metal and alkaline earth metal hydrides, aluminum hydrides and alkyls, metal borohydrides, complex metal aluminum hydrides, boron alkyls, and the like.

The organic compounds containing carbon-carbon double bonds which can be polymerized by the catalysts of our invention are such as monoolefins and diolefins having the formula RHC:CH$_2$, where R is hydrogen or an alkyl, alkenyl, or aryl group, or combinations of such groups. Preferred feedstocks are the vinyl type olefins containing from two to eight carbon atoms, inclusive, per molecule. Those which contain two to four carbon atoms, inclusive, are most commercially attractive now. Suitable feedstocks comprise ethylene, propylene, 1-butene, 1-pentene, 1-heptene, 1-octene, 1-dodecene, 1-tetradecene, 1-hexadecene, t-butyl-ethylene or their mixtures and the like. Examples of isoalkyl ethylenes which can be used as components of polymerization feedstocks are 3-methylbutene, 4-methylpentene, 5-methylhexene or their mixtures with each other or with normal 1-alkenes, and the like. Aryl-substituted olefins may also be used, and are exemplified by styrene. Suitable diolefins include butadiene, piperylene, isoprene, etc.

Our inventive process is most advantageously employed in the polymerization of ethylene, alone and with propylene. The practice of the inventive process can lead to grease-like ethylene homopolymers having an approximate molecular weight range of 300 to 700, wax-like ethylene homopolymers having an approximate specific viscosity ($\times 10^5$) between about 1000 and 10,000, and tough, resinous ethylene homopolymers having an approximate specific viscosity ($\times 10^5$) of 10,000 to more than 300,000 [$(\eta$ relative $-1) \times 10^5$]. By the term "tough, resinous polyethylene" as used in the present specification, we mean polymer having a brittle point below $-50°$ C. (A.S.T.M. Method D746–51T), impact strength greater than two foot pounds per inch of notch (A.S.T.M. Method D256–47T–Izod machine) and minimum elongation at room temperature (25° C.) of 100%. Various useful ethylene-propylene copolymers can readily be made according to the process of our invention. The total list of useful products is so large as to preclude detailing it herein, but the usefulness of our process for production of a wide range of polymers will be obvious to those of skill in the art.

The olefin feedstock may contain unreactive diluents such as saturated hydrocarbons of similar or identical boiling range, for example, as in alkenes or their mixtures derived from petroleum refining operations without harm to our inventive process. Water, oxygenated compounds such as carboxyls, oxygen, etc., are best eliminated from the feed by prior treatment, as for example with 4 A. molecular sieve, silica gel, etc. The feedstocks may comprise olefin feed alone or in solution in a substantially inert liquid reaction medium in a concentration in the range of about 1 to about 25 percent by weight of the total solution. Higher concentration, e.g. up to 100 percent, may if desired be employed, as for example in the polymerization of propylene where no inert liquid need be present.

A substantially inert liquid reaction medium is desirably employed during the polymerization. This liquid is preferably a normally liquid saturated aliphatic or aromatic hydrocarbon but can be a relatively unreactive alkene (containing a non-terminal double bond) or in some instances, a cycloalkene, a perfluorocarbon, a chloroaromatic or mixtures of suitable liquids as the case may be. By "substantially inert liquid reaction medium," reference is made to liquids which remain liquid under polymerization conditions and which do not substantially interfere with the reaction or deleteriously affect the resultant polymer. Suitable liquid reaction media for ethylene polymerization include various hydrocarbons, particularly aromatic hydrocarbons such as benzene, toluene and xylenes. A suitable solvent is a hydrocarbon fraction commonly called odorless mineral spirits. This is a predominantly $C_{12}$ hydrocarbon fraction having a boiling point in the range of 185° C. to 195° C. Similarly, such reaction media are useful with polymerizable compounds other than ethylene.

Polymerization conditions advantageously include a temperature within the range of about 0° C. to about 300° C., the preferred conditions being above about 110° C. Optimum temperatures are largely dependent upon the particular catalyst employed. When polymerization is effected at relatively high (110–300° C.) temperatures, and particularly but not exclusively when the liquid reaction medium comprises hydrocarbon, most polymers are in the reaction mixture as liquids or gels which are miscible with or soluble in the liquid reaction medium.

The concentration of catalyst and the optional promoter are not critical. The proportion of catalyst (including support) based on the weight of olefin feedstock can range from 0.1 weight percent to 20 weight percent or even more. The promoter may, illustratively, be present in a molar ratio of from 100:1 to 1:1 based on the catalytic oxide. Suitable conditions for polymerization are also detailed in the various patents referred to hereinabove with respect to catalysts.

The preparation of catalyst according to our inventive method, and the process of polymerization of olefin feedstock therewith will be better understood in light of the description which follows. This description is presented with regard to the preparation and use of a molybdena-on-alumina catalyst, with sodium promotion, for the polymerization of ethylene. It will be understood by those of ordinary skill in the art that other supported transition metal oxide catalysts, other promoters and other olefins as described hereinabove can be similarly employed in the practice of our invention.

The preparation of a typical catalyst useful in the practice of our invention is accomplished in three main steps, viz., calcination, reduction, and chloriding. Preparation of the alumina base material and impregnation with the selected transition metal compound are familiar to the art and are therefore not presented in detail. An alumina base material, either prepared according to well known techniques for the preparation of hydroforming catalyst base materials, or a commercially-purchased material having the desired pore diameter, is calcined in a muffle furnace at about 600° C. for two hours, until substantially all moisture in the alumina base has been driven off. The pore volume of the calcined material can be determined by water titration to the "caking end point," as described by Innes, Analytical Chemistry, vol. 28, page 332 (1956).

Once it has been determined that a particular alumina base possess a pore diameter within the desired range, catalyst preparation can proceed with the uncalcined base material. It is not necessary to calcine the alumina base prior to impregnation with the transition metal compound. The base is saturated with a sufficient amount of aqueous ammonium hepta-molybdate to provide the desired final molybdenum content and to yield a damp cake with little or no excess moisture. The concentration of the aqueous ammonium hepta-molybdate solution is readily adjustable to achieve the desired damp cake with a desired final molybdenum content. We have found that the final molybdenum content is preferably about 20–21% on a base with a surface area of 350 m.$^2$/gm. Water is then removed from the damp cake by any suitable means. We have found the use of a Rinco evaporator system to be effective. The removal of water can be facilitated through the use of a moderate vacuum, for example, 200 to 500 mm. and a slightly elevated temperature, for example, 70 to 90° C. The catalyst thus obtained appears to be a dry, free-flowing powder, though it still possesses a substantial moisture content on the order of 20 to 35%. The free-flowing powder is screened to remove lumps and is then subjected to calcination.

While the above description of transition metal oxide deposition on the support is in terms of impregnation, we have also found that co-gelling is a suitable preparative method and is even sometimes more desirable than impregnation since it is simpler to obtain a uniform coating of transition metal oxide on the support through co-gelling. A suitable co-gelling method is to make a homogeneous mixture of alumina sol and soluble molybdenum compound. This can be forced through spinning orifices into a heated chamber where water is flashed off. From such operation, there are obtained spheroidal catalyst particles containing such a highly dispersed form of molybdenum that X-ray analysis of calcined catalyst fails to detect molybdic oxide.

There is generally a small increase in surface area on the order of 5–20 m.$^2$/gm., a slight decrease in pore volume on the order of 0.15–0.20 cm.$^3$/gm. and an increase in bulk density on the order of 0.05–0.08 gm./cc. when wet impregnation of an alumina catalyst base is performed. An even distribution of molybdenum oxide is highly desirable, and care must be exercised in the deposition step. The importance of pore size on catalyst activity is illustrated in the examples hereinbelow. If molybdenum oxide is not evenly distributed, there can be an adverse effect upon pore size uniformity and thus upon catalyst activity.

Catalyst calcination can be conveniently carried out by placing the powdered impregnated base material in a Vycor tube capable of withstanding temperatures up to 700° C. and impervious to moist hydrogen chloride. The tube is conveniently heated with an electric furnace and equipped for rotation so that all catalyst can be exposed to gases passing through the tube. Using a Vycor tube about 1¾ inches in diameter and 12 inches in length, rotating at about 25 r.p.m., we charge about 30–35 gm. of molybdenum-impregnated alumina base. This is heated to a calcination temperature of 600–650° C. for at least one hour while a stream of dry air, or oxygen, with or without an inert diluent is passed across the catalyst bed at 100–250 cc./min. This calcination step is performed in order to remove moisture from the catalyst, to break down the molybdenum compound used for impregnation and produce a molybdenum oxide, and to redistribute the molybdenum compound more evenly. We believe that the calcination also forms an Al-O-Mo structure which is essential to an active catalyst.

Calcination should be carried out within the indicated temperature range, for a lower temperature may not produce an active catalyst and a higher temperature results in sintering of the catalyst and lowered activity by collapse of pore structure and loss of surface area.

After calcination of the catalyst, leaving it in the apparatus described above, the temperature is reduced to 450–475° C. and the apparatus flushed with an inert gas. A hydrogen stream is then introduced, in order to reduce the molybdenum below its maximum valence state of 6. The hydrogen flow is maintained at 200–250 cc./min. for 30 to 45 minutes. The molybdenum is then at an average oxidation state close to 5 and the catalyst is a characteristic dark brown color. We have found that an oxidation state averaging from 4.7 to 5.1 is desirable, and 4.9 to 5.0 is preferred. Or course, for Group V elements, these values would be proportionally lower, being desirably about 4.

The even distribution of molybdena on the support is important at the reduction stage, for we have found that excessively thick areas of molybdena are readily reduced to oxidation states of 4 or lower. It is also important to maintain the temperature for reduction within the 450–475° C. range, since temperatures above and below this range cause the formation of catalyst having a relatively lower activity.

While the catalyst prepared as described hereinabove with an average pore diameter within the range of 100–200 A. has an increased activity for polymerization of olefins as compared to that heretofore described in the art and made without special care as to pore diameter, there is a phenomenal increase in activity when the above-described catalyst is subjected to a chloriding treatment.

The catalyst, calcined and reduced, is now subjected to a chloriding treatment which can be carried out in the apparatus described above.

Chloriding may be effected at any stage of catalyst preparation; where the molybdena on alumina is calcined in an oxygen-containing gas and thereafter reduced with a reducing gas such as hydrogen for valence control, chloriding may be applied before oxidation, between oxidation and reduction, after reduction, or during oxidation or reduction. Hydrogen chloride treatment is convenient and is advantageously conducted at a temperature within the range of about 20 to 500° C., preferably about 150–450° C., and optimally about 300–400° C. The treatment time may range from as little as 0.01 hour (at high hydrogen chloride concentrations and high temperatures) to as much as 20 hours or more (at lower temperatures and lower hydrogen chloride concentrations). A practical range is about 0.25–3.0 hours.

The chloriding agent may be employed in any concentration and at any pressure. Thus the concentration may range from as little as 0.5% to 100% hydrogen chloride, the balance being preferably a gas which is neither oxidizing nor reducing; nitrogen or the rare gases such as argon or helium are optimum in this respect. A moving stream of gas is preferable, for it carries away any volatile transition metal chlorides or oxy-chlorides.

The hydrogen chloride and any accompanying inert gas diluent appear to be most effective when employed in the absence of any moisture, although this is not a mandatory requirement. Treatment at atmospheric pressure is most convenient, although the treating pressure may range from as little as 0.01 atmosphere hydrogen chloride pressure to as much as 10 atmospheres or more. Included within the scope of the invention are substances which are capable of producing hydrogen chloride by reaction on the catalyst, e.g. chlorosulfonic acid.

While the reason for the efficacy of chloride treatment is not clear, it appears that chloride reacts in some manner with the alumina and, perhaps, with the molybdena so as to deposit a substantial amount of halide on the catalyst, e.g. 0.1 percent to about 6 percent by weight. As the same time, a portion of the molybdena is unavoidably volatilized off, presumably in the form of a halide or oxy-halide, and this may range from about 0.01 percent to about 5 percent or so. The removal of hydrogen chloride from a treating gas stream, or correspondingly the presence of water in the effluent gas, can be taken as measures of progress of the treatment.

We prefer to perform the chloriding treatment by heating the catalyst at 300° C. for 30 minutes with a gas mixture stream comprising a flow of about 300 cc./min. hydrogen chloride and about 150 cc./min. nitrogen or argon. We then raise the temperature to 490–500° C. for an additional 30 minutes at a reduced gas flow of about one-third and subsequently cool the catalyst. A two-stage treatment appears preferable for greatest catalyst activity, though a single stage chloriding at 400° C. for about 30 minutes to one hour can be used. The chloriding treatment should be effected in the range of 300–500° C. for we have found that treatment at temperatures outside such range does not provide a highly active catalyst. The chloride treatment should be effected under such conditions and for such period of time that the catalyst contains about 2 to 5% chlorine by weight.

Following the method set forth above, one can obtain an especially active molybdena-on-alumina polymerization catalyst. This catalyst may be employed directly for polymerization or can be comminuted to a 60 to 200 mesh particle size. The prepared catalyst should be stored in a dry inert atmosphere for it will otherwise pick up air and moisture which have a harmful effect upon activity.

Catalysts prepared as described above can be used in polymerization reactions at pressures ranging from atmospheric to 10,000 p.s.i.g., 20,000 p.s.i.g. or more. The contact time or space velocity, as well as other polymerization variables can be selected with reference to the type of product desired and the extent of conversion desired. The selection of specific polymerization conditions is within the skill of those in the art, and suitable conditions have been described in various of the patents referred to hereinabove with respect to olefin polymerization catalysts.

We prepared a series of catalysts according to the method described above, these catalysts having different pore diameters but containing about equivalent amounts of molybdenum and having about equal surface areas. The molybdenum contents were about 20–21% by weight and the surface areas were about 300–325 m.²/gm.

We have found that activity of the catalysts drops sharply as the transition metal content is varied on either side of the optimum 20–21% level, with the variations in activity being more pronounced with chlorided catalyst as compared to unchlorided catalyst. Further, we have found an empirical relationship between molybdenum content per unit of surface area and the optimum catalyst activity, which can be expressed as:

Optimum Molybdenum Content=0.65 mg. $MoO_3$/gm. catalyst/m.$^2$ surface area

The series of catalysts referred to above was used to polymerize ethylene at 280° C. under 1000 p.s.i.g. ethylene pressure in a bomb reactor containing 300 gm. (400 ml.) of purified odorless mineral spirits solvent. The activity of chlorided and unchlorided samples of the same catalyst was compared, and the results are listed in Table I. The catalyst loading was 1.0 gm. for unchlorided catalyst and 0.25 gm. for chlorided catalyst. A smaller amount of chlorided catalyst was used because of its higher activity. A dispersed sodium promoter was used in the tabulated runs, to the extent of 0.25 gm. with unchlorided catalyst and 0.05 gm. with chlorided catalyst. In runs where catalyst activity exceeded 300 gm./gm./hr. in the initial experiment, a duplicate experiment was performed using only 0.15 gm. of catalyst and 0.03 gm. of sodium. The product was recovered from the solvent and worked up by ordinary techniques. The addition of molybdenum oxide to the alumina base reduced the pore size of the ultimate catalyst slightly below that of the original base. Pore sizes given are those of the base material, as a matter of convenience.

erization of 250 gm./gm./hr., in the polymerization of 50:50 ethylene-propylene and 70:30 ethylene-butane-1 mixtures. We have found that the chlorided catalyst polymerized such monomer mixtures at rates of 102 and 120 gm./gm./hr. respectively, as compared to rates with unchlorided catalyst, of 12 and 7 gm./gm./hr.

We believe, though we cannot state with certitude, that the increase in catalyst activity obtained from 50 to 150 A. pore diameter is related to an increasing ease of removal of the formed polymer molecule from active centers of the catalyst, thus permitting growth of additional polymer chains and easy diffusion of monomer to the active sites. As the pore diameter increases, and the catalyst surface becomes more planar, there may be a decrease in active polymerization sites, since sites may depend to a considerable extent upon exposed crystal lattice defects at edges of pores. We have discovered that it is not possible to obtain a catalyst of high activity by blending one catalyst of small pore size with another catalyst of large pore size to obtain a catalyst having an average pore size in the optimum range. The necessity for a narrow critical range of pore size in an active catalyst tends to support our proposed explanations of increasing and diminishing catalyst activity with increasing pore size. Our experimental results presented in the tables and in the draft indicate that pore diameters within the range of 125 to 180 A. are preferred for the practice of our invention. However, though these hypotheses serve to explain the results we have observed with our catalysts, we are unable to definitely attribute the observed results to any specific features of the catalysts other than pore diameter. The phenomenal increase in activity of chlorided catalyst

TABLE I

Effect of variation in catalyst base pore diameter upon catalyst polymerization activity for unchlorided and chlorided molybdena on alumina catalysts

| Catalyst No. | Pore volume, cm.$^3$/gm. | Average pore diameter, A. | HCl treated | Chlorine content [1] | Polymer product | | Catalyst activity (gm./gm./hr.) [2] |
|---|---|---|---|---|---|---|---|
| | | | | | Total grams | Melt index (gm./10 min.) | |
| 1 | 0.54 | 72 | No | 3.9 | 16 | 1.65 | 11 |
| | | | Yes | | 36 | 2.02 | 41 |
| 2 | 0.85 | 107 | No | 4.3 | 50 | 0.40 | 33 |
| | | | Yes | | 53 | 0.32 | 141 |
| 3 | 0.91 | 111 | No | 4.9 | 43 | 1.05 | 29 |
| | | | Yes | | 58 | 0.36 | 155 |
| 4 | 0.98 | 124 | No | | 50 | 5.0 | 34 |
| | | | Yes | | 50 | 0.60 | 160 |
| 5 | 1.02 | 130 | No | 4.7 | 54 | 0.53 | 36 |
| | | | Yes | | 55 | 0.48 | 220 |
| 6 | 1.08 | 138 | No | 4.4 | 55 | 1.40 | 44 |
| | | | Yes | | 55 | 0.46 | 225 |
| 7 | 1.16 | 148 | No | 4.8 | 55 | 0.67 | 44 |
| | | | Yes | | 61 | 0.57 | 243 |
| 8 | 1.25 | 154 | No | 3.5 | 61 | 0.49 | 40 |
| | | | Yes | | 75 | 0.42 | 300 |
| 9 | 1.27 | 145 | No | 4.7 | 55 | 0.53 | 44 |
| | | | Yes | | 68 | 0.57 | 272 |
| 10 | 1.34 | 172 | No | 4.8 | 61 | 2.5 | 41 |
| | | | Yes | | 57 | 0.26 | 228 |
| 11 | 1.43 | 181 | No | 4.2 | 59 | 0.94 | 47 |
| | | | Yes | | 58 | 0.31 | 232 |
| 12 | 1.72 | 205 | No | 5.2 | 33 | 1.31 | 22 |
| | | | Yes | | 83 | 0.48 | 110 |

[1] Percent by weight based upon total of other catalyst components.
[2] Grams of polymer produced per gram of catalyst per hour.

From the tabulation of examples presented above, it is apparent that the pore diameter of a catalyst support has a significant and unexpected effect upon catalyst activity. This effect is accentuated to a phenomenal extent when the catalyst is chlorided.

Results similar to those set forth above can be obtained with the other transition metal oxides of our invention and with other polymerizable feedstocks. Of course, as will be realized by those of ordinary skill in the art, the yields of polymers which can be obtained from monomers other than ethylene will generally be lower than yields with ethylene, inasmuch as ethylene is more readily polymerized than many other monomers.

Copolymers can also be made by our inventive process. For example, we have used a catalyst, prepared as described above and having an activity for ethylene polymas compared to unchlorided catalyst is not easily explained and we offer no hypothesis therefor.

The increase in activity of chloride catalyst also appears to be specific to catalyst which has been chlorided by treatment with anhydrous hydrogen chloride. We have attempted introduction of halogen with other treating agents and have found it difficult to achieve the desired level of halogen content and have found that when a halogen content within our desired range was achieved the effect was not the same as with anhydrous hydrogen chloride. Table II presents the results obtained with several treating agents in terms of the weight percent chloride in the catalyst and its effect upon polymerization activity. The catalyst support was predominantly alumina which had a surface area of about 155 m.$^2$/gm. and a pore diameter within the range of 100 to 110 A. The pore diameter was reduced to a measured 85 A. following impregnation, such reduction being typical of the catalysts of our invention.

TABLE II

| Treating agent | Chlorine content [1] | Polymerization activity |
|---|---|---|
| Aqueous HCl | 1.06 | No change. |
| Aluminum chloride | 4.90 | Decrease. |
| Chlorine | 2.0 | No change. |

[1] Percent by weight based upon total of other catalyst components.

Having thus described our novel method of catalyst preparation, our novel catalysts and their use, what we claim is:

1. A process for the polymerization of an olefin selected from the group consisting of ethylene, propylene and mixtures thereof which comprises polymerizing said olefin under polymerizing conditions of temperature and pressure over a catalyst which is a solid composition produced by distributing about 20 weight percent of molybdenum as the oxide, upon an alumina, said alumina having a surface area within the range of 150 to 500 m.$^2$/gm. and a pore diameter within the range of 100 to 200 A., reducing said molybdenum oxide to an average valence about one less than maximum and chloriding the resulting combination with anhydrous hydrogen chloride to a chlorine content within the range of about 2 to about 5 percent by weight.

2. The process of claim 1 wherein said olefin is ethylene and said catalyst is a solid catalyst for the polymerization of ethylene produced by distributing about 20 weight percent of molybdenum as the oxide upon an alumina, said alumina having a surface area of about 325 m.$^2$/gm. and average pore diameter within the range of 125 to 180 A., reducing said molybdenum oxide with hydrogen at a temperature in the range of 450–475° C. for a period of time sufficient to lower the average valence state of the molybdenum in said molybdenum oxide to 5 and chloriding the resulting combination with anhydrous hydrogen chloride at a temperature within the range of 300 to 500° C. to a chlorine content within the range of 2 to 5 percent by weight.

References Cited

UNITED STATES PATENTS

| | | | |
|---|---|---|---|
| 2,891,937 | 6/1959 | Reed et al. | 260—94.9 |
| 3,105,066 | 9/1963 | MacKenzie | 260—94.9 X |
| 3,225,023 | 12/1965 | Hogan et al. | 260—94.9 |
| 2,739,132 | 3/1956 | Riedl | 252—439 |
| 2,739,133 | 3/1956 | Schwarzenbek | 252—442 |
| 2,799,661 | 7/1957 | DeRosset | 252—465 |
| 3,352,795 | 11/1967 | Shepard et al. | 252—442 |

PAUL M. COUGHLAN, Jr., Primary Examiner

U.S. Cl. X.R.

260—88.2 B, 93.7, 94.9 D